United States Patent Office 3,330,341
Patented July 11, 1967

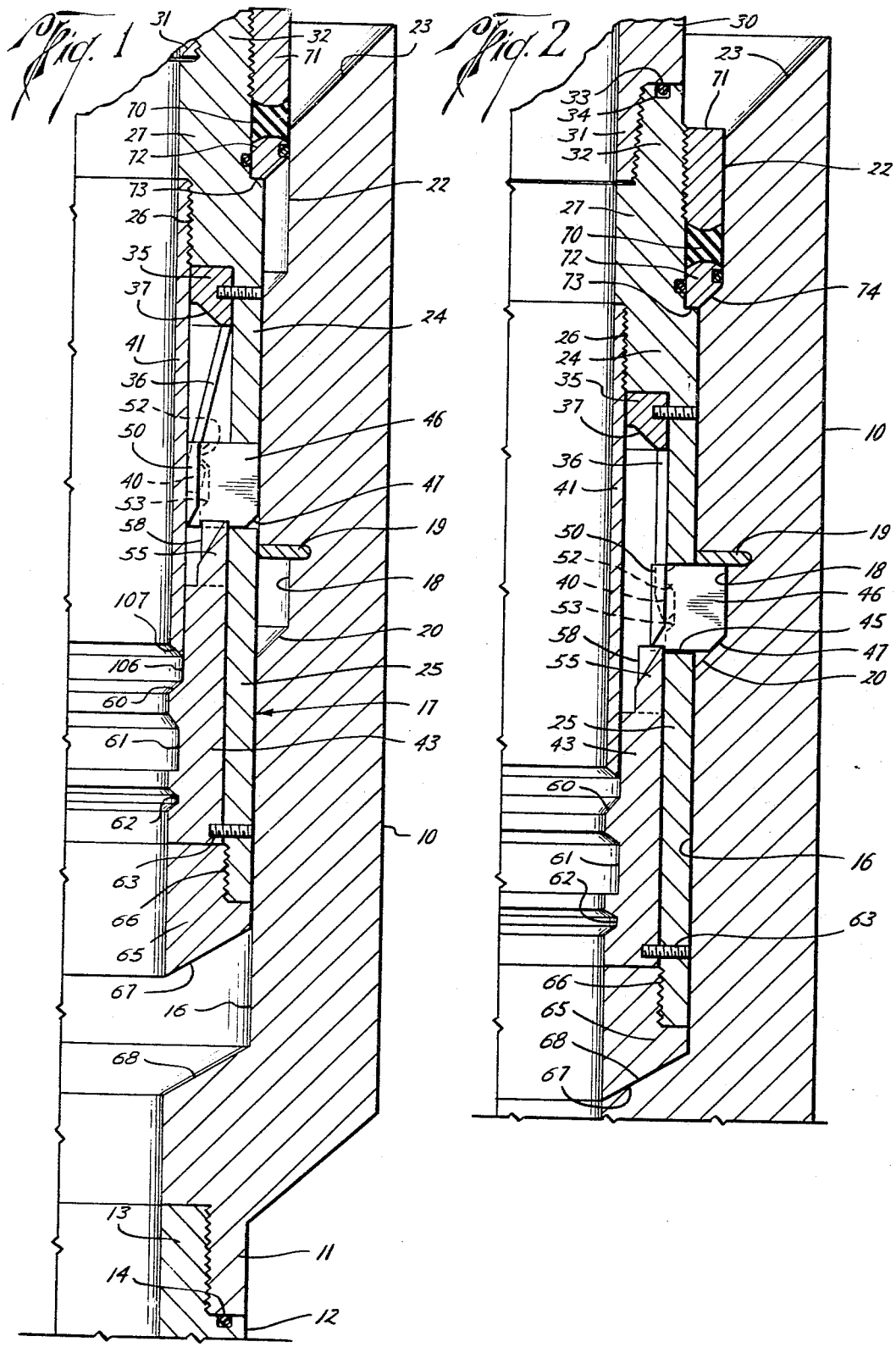

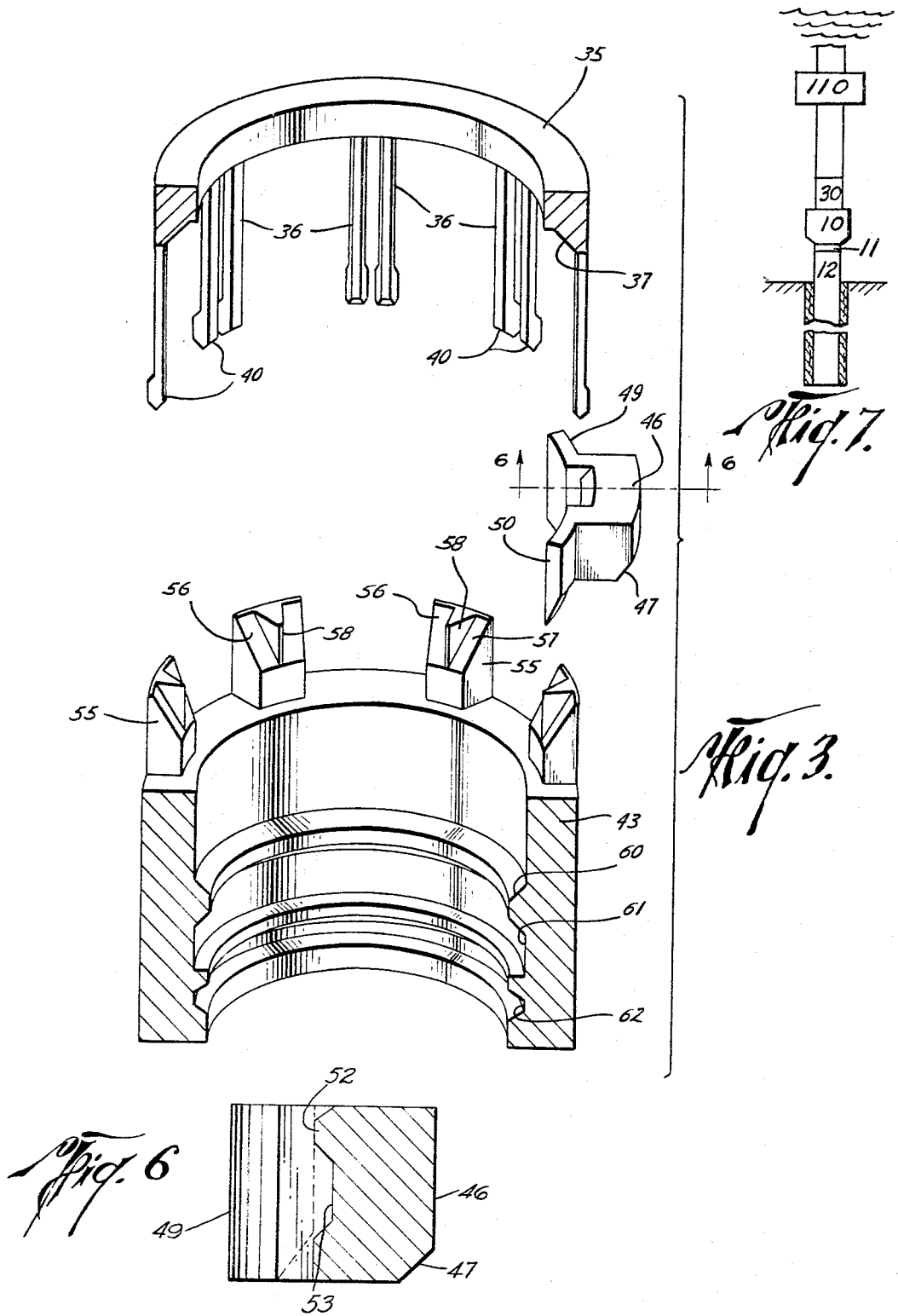

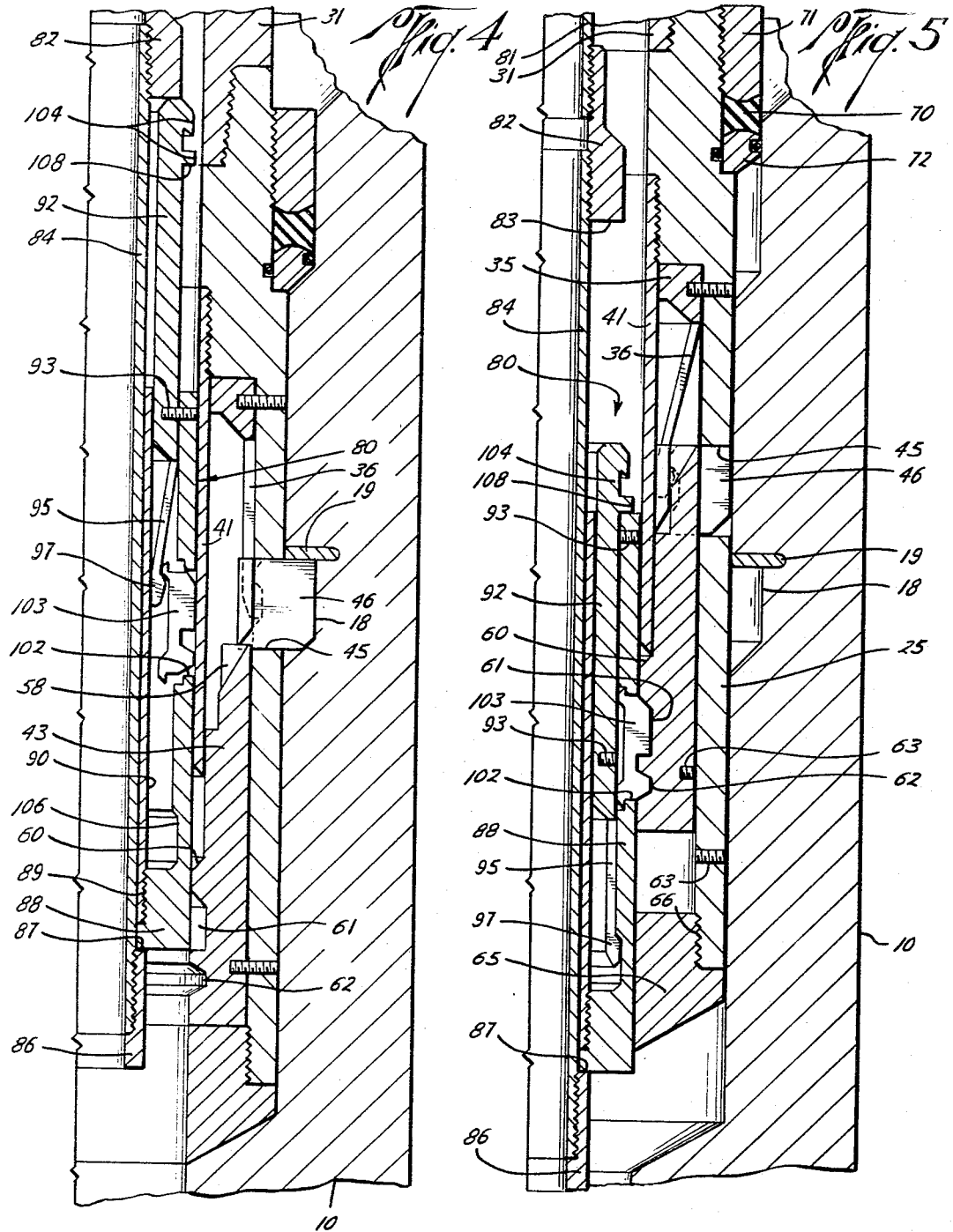

3,330,341
REMOTELY POSITIONABLE AND REMOVABLE WELLHEAD CONNECTION AND SEALING APPARATUS
John G. Jackson, Jr., deceased, late of Angleton, Tex., by Bank of the Southwest National Association, independent executor, Houston, Tex., and Allen F. Rhodes, Pittsburgh, Pa., assignors to Rockwell Manufacturing Company, Pittsburgh, Pa., a corporation of Pennsylvania
Continuation of abandoned application Ser. No. 743,741, June 23, 1958. This application Dec. 6, 1965, Ser. No. 512,274
14 Claims. (Cl. 166—.6)

This application is a continuation of prior application Serial Number 743,741, filed June 23, 1958, entitled "Pipe Connection," now abandoned in favor of this application.

This invention pertains to remote connections for conduits, that is, to conduit connections which can be operated or controlled from remote points. The connections will probably be found to be most useful in connection with petroleum wells which are completed beneath a water surface, the invention then affording connections at the completion which can be assembled and disassembled from the water surface.

A principal object of the invention is to provide conduit connections which are operable remotely.

Another object of the invention is to provide such connections which are fluid tight.

Another object of the invention is to provide such connections which can be assembled and disassembled quickly and readily from a remote point according to ordinary well operation procedures, which are convenient to use, which are adapted to repeated uses at the same or different locations, and which are dependable in use.

Another principal object of the invention is to provide apparatus for making remote conduit connections which are locked in the connected condition so that they cannot be accidentally disconnected and so that they are not easily broken by shock imparted to connection or conduit.

Briefly, the connections according to this invention include a receiver forming the top of a wellhead assembly and a tubular connector body forming the lower end of a well drilling or completion apparatus such as a pipe string, blowout preventer, Christmas tree, or any other equipment which it is desired to remotely connect to the wellhead assembly. The connector body is adapted to be sealingly engaged with the receiver and locked in place, thereby connecting the wellhead assembly and the apparatus thereabove so that the well can be flowed through the well pipe or sealed off as desired. The invention also contemplates apparatus for connecting and disconnecting the receiver and connector body.

Other objects and advantages than those mentioned above will appear from the following description of a preferred embodiment of the invention, with reference to the accompanying drawings, of which:

FIGURE 1 is a vertical half section taken along the axis of the preferred embodiment, showing the apparatus in the condition in which it is run through confining passages;

FIGURE 2 is like FIGURE 1, showing the apparatus in the "set" or "latched" condition;

FIGURE 3 is an axial vertical section, in perspective and exploded, showing internal elements of the apparatus of FIGURES 1 and 2;

FIGURE 4 is a vertical half section of the apparatus of FIGURES 1-3, showing a retrieving means therewithin in running in condition;

FIGURE 5 is like FIGURE 4, showing the apparatus in retrieved condition;

FIGURE 6 is an enlarged vertical section taken through the center of a latching means of the apparatus; and FIGURE 7 is a schematic view showing an underwater petroleum well equipment incorporating the apparatus.

Referring now to the drawings in detail, and first to FIGURES 1–3, the remote connection or remote joint, in the preferred embodiment according to the invention, includes a receiver 10 which is of generally cylindrical form with a passage extending axially therethrough. At its lower end receiver 10 is reduced in outer diameter to provide a threaded socket formation 11 as means for connecting the receiver at its lower end to a conduit such as well pipe or member 12, which has upper threaded pin 13. A seal, such as the O-ring 14, is usually provided around this connection.

Above socket 11 reeciver 10 increases in diameter conically upwardly and outwardly to form a cylindrical land 16 for receiving the tubular connector body 17. Intermediate the length of the land 16 there is an internal annular recess or locking groove 18, forming an engagement means, having at its upper side the hardened steel ring 19, in a groove extending outwardly of the recess, and having a lower conical side 20.

The upper end of receiver 10 is annularly recessed to form a stuffing box 22. The receiver 10 flares conically at 23 above the stuffing box to the upper end of the receiver to provide means for guiding the tubular connector body 17 into alignment with receiver 10.

The tubular connector body 17 of the connection comprises an outer sleeve-like tubular conduit member 24, or latching sleeve, having a lower tubular portion 25 and an internal threaded socket formation 26 of reduced internal diameter thereabove, there being thus formed an annular recess inwardly of portion 25 below formation 26. Above the socket a thick walled cylindrical portion 27 provides an interior surface flush with an upper conduit or pipe 30 having lower threaded pin 31 which is screwed into an upper threaded socket 32 of sleeve member 24. An O-ring 33 disposed in a circular groove 34 around the upper end of sleeve member 24 provides a fluid-tight seal at this joint.

The tubular conduit or sleeve member 24 has a steel ring 35 connected therewithin below socket 26. Ring 35 has a plurality of pairs of downwardly extending spring elements 36 at the outer edge of its lower side. The under side 37 of the spring ring 35 is beveled upwardly from the spring elements and has a horizontal inner edge. The lower ends of the spring elements have enlarged lug portions 40 to engage lug groove to be described. An inner shield sleeve 41 is screwed at its upper end into socket 26 and extends downwardly therefrom to cover the ring 35 and the upper part of a retrieving sleeve 43.

Sleeve member or tubular conduit 24 has a plurality of window openings 45 therethrough, circularly and spacedly arranged coincident with the lug portions of the springs, the springs being arranged in pairs opposite each window opening (only one window opening is shown in the drawings). In each of the window openings there is a movable latch 46 having a lower outer bevel 47 to enable the latch to pass confined opening irregularities on downward movement. At its radially inner side each latch 46 has a pair of side webs 49, 50 integral therewith for preventing movement of each of the latches completely through its window opening 45. The lower parts of the outer sides of webs 49, 50 are beveled conically and upwardly diverging as shown. Between the webs, each latch 46 (see FIGURE 6) has a shaped section including an upper rib 52 set back from the inner latch surface and therebelow a recess 53 to receive the lug portion 40 of each of a pair of springs 36. The latches 46, circumferentially disposed about tubular conduit 24, provide latch means extendible by latch actuating means including springs 36 into inoperative position beyond the outer surface of conduit 24 into engagement with groove 18 in the receiver 10 and retractable into inoperative position within the outer surface of conduit 24 by latch actuating means including retrieving sleeve 43 in a manner next to be described.

The intermediate retrieving or releasing sleeve 43 is tubular in form and has an extending element 55 at its upper surface midway between each pair of springs 36 and disposed between adjacent latching lugs. These are of substantially rectangular horizontal section at their bases and at their upper ends are provided with cam surface means. The cam surface means comprises conical upwardly diverging side surfaces 56, 57 separated by an inwardly pointing wedge formation 58. Near its lower end retrieving sleeve 43 has a shoulder 60 and recesses 61, 62, the shoulder being conical, recess 61 having a conical upper side and a horizontal lower side, and recess 62 having conical upper and lower sides. Normally, retrieving sleeve 43 is held in a lowered position relative to sleeve 24 by a shear pin 63 forming a releasable connection means.

A nut 65, in the form of a ring, is screwed to the lower end of sleeve element 24 at threads 66 thereof, and has an upper side abutting the retrieving sleeve in its normal position. When the tubular connector body 17 is telescoped axially into engagement with the cylindrical land 16 of receiver 10, springs 36 bearing against the inner portions of latches 46 within the annular recess in tubular conduit 24 urge the outer portions of the latches extending out of the annular recess of tubular conduit 24 to enter recess 18 and the annular downwardly facing beveled lower surface 67 of nut 65 prevents further downward movement of the tubular connector body 17 by seating against correlative upwardly facing beveled surface 68 on the receiver.

A sealing means comprises an annular gasket ring 70 of elastomeric material held around the upper end of the tubular conduit or sleeve element 24 between the circumferential downwardly facing surface provided by the lower end of a threaded compression nut 71 and a coaxial support ring 72 which is seated on the annular upwardly facing surface provided by shoulder 73. When the tubular connector body 17 of the connection is in place, conical shoulder 74 of circumferential packing recess 22 forces ring 72 upwardly to axially compress ring 70 and form a fluid tight seal between tubular connector body 17 and receiver 10.

It is to be observed that since axial travel is limited by engagement of the downwardly facing surface of nut 65 with upwardly facing surface 68 of the receiver, which takes the weight of any equipment 30, such as a blowout preventer means, connected to tubular conduit 24, entire reliance for sealing is not placed on compression of the seal. The gasket ring 70 is dished at its upper and lower surfaces forming inner and outer peripheral lips which inherently seal under fluid pressure. An outer part of the gasket ring seals with the recess 22 and the part of the gasket ring in engagement with the tubular conduit 24 seals therewith.

When the latches 46 are set in recess 18 the beveled lower parts of webs 49, 50 extend inwardly of the inner wall of sleeve element 24 and the spring elements 36 hold the latches thus extended. When it is desired to break the connection for some reason, an operator means such as a retrieving tool, as shown in FIGURES 4–5, may be employed. The retrieving tool is connected to a string of pipe 81 by a screwed coupling 82 having an enlarged lower part to provide a lower shoulder 83. A tubular inner sleeve element or mandrel 84 is screwed into the lower end of coupling 82. A retaining nut 86 providing outwardly protruding upper shoulder 87 is screwed onto a lower end of mandrel 84. Shoulder 87 supports a latch sleeve 88 having lower interior thread formation 89 into which an intermediate sleeve 90 is screwed. A spring sleeve 92 or mandrel is connected by shear pin 93 in a raised position relative to sleeve 88, the shear pin forming a frangible connection therebetween. The lower end of sleeve 92 has a plurality of downwardly extending integral springs 95 similar to springs 36 and having lower end lugs 97. A plurality of window openings 102 circularly arranged around sleeve 88 have freely received therethrough a plurality of latch members 103. When spring sleeve 92 is in said raised position, the lugs 103 are free to move radially to retracted positions in openings 102, but are biased radially outwardly by the springs 95. Spring sleeve 92 has an overshot engaging formation 104 at its upper end.

When the retrieving tool at the lower end of pipe 81 is inserted into the tubular connector body 17 of the connection, sleeve 41 prevents latch members 103 from entering the space occupied by springs 36 and lugs 46, but the latch members 103 are of suitable dimensions and form to enter recesses 61, 62. When the latch members 103 are in recesses 61, 62, sleeve 88 cannot be moved downwardly and further downward motion of coupling 82 engages coupling shoulder 83 with the upper end of spring sleeve 92 to shear pin 93. The part of spring sleeve 92 above springs 95 thereof moves down to back up latch members 103 so that they cannot be moved out of recesses 61, 62. Springs 95 engage, at their lower lug portions 97, in a lower recess 106 of sleeve 88 to prevent upward motion of the spring sleeve within sleeve 88. Shoulder 108, abutting the upper end of sleeve 88, prevents further relative downward motion of sleeve 92 on sleeve 88.

With latch members 103 thus engaged and firmly held, the string 81 can be raised to draw tool 80 and retrieving sleeve 43 upwardly. The side surfaces 56 of each element 55 and the side surfaces 57 of the adjacent element 55 engage the lower bevels of webs 49, 50 to either side of each latch 46 to retract latches 46 out of recess 18 against the pressure of springs 36, pin 63 thereupon being sheared in order that sleeve 43 can be moved upwardly relative to sleeve portion 25. The tubular connector body 17 of the connection and the retrieving tool 80 held therewithin can now be pulled out of land 16.

As has been indicated, the apparatus herein described and shown is particularly useful in connection with underwater wells, such as petroleum wells having their casing and tubing hanging equipment beneath the water surface and frequently upon a submarine land surface. It will be readily seen that the invention will have many useful applications in such wells and, in addition, will have many other uses in other diverse applications.

In the case of underwater petroleum wells, the receiver part 10 of the connection can be secured at the upper end of the casing and tubing hanging equipment. The tubular connector body 17 can be secured to the lower end of any equipment which it is desired to remotely connect to the upper end of the hanging equipment, such as blowout preventers 110 (see FIGURE 7), pipe strings, Christmas trees or any other. Then, when the inserted part 17 is introduced into receptacle 10, a sealed and latched-in-place connection is easily made, and the connection can later be unlatched so that substitute equipment can be installed, so that the well may be reworked and so that repairs can be made.

While a preferred embodiment of the invention has been shown and described herein, many modifications thereof may be made by a person skilled in the art without departing from the spirit of the invention, and it is intended to protect by Letters Patent all forms of the invention falling within the scope of the following claims.

What is claimed is:

1. Conduit connection device, comprising a tubular receiver having a passage therethrough, groove means around said passage within said body, and a tubular connector body telescopically received in one end of said passage and releasably engaged with said groove means;

said tubular connector body comprising an interior tubular sleeve and a latching sleeve outwardly spaced therefrom and disposed within the passage of said body and between said body and tubular sleeve, said latching sleeve having a plurality of window openings therethrough circularly spaced therearound and having an interior recess, a latch engageable in said groove means and having outwardly facing bevel surface means disposed in each said window opening for radial inward and outward movement, a spring ring disposed in said interior recess of said latching sleeve and having a plurality of depending longitudinal spring elements therearound parallel to the axis of the receiver and tubular connector body, said spring elements terminating opposite said window openings in engagement with the radially inner sides of said latches to bias said latches radially outwardly in said window openings, said tubular sleeve being carried by said latching sleeve and shielding said latching sleeve and said spring elements and said latches inwardly; a seat ring carried at the end of said latching sleeve which is toward the opposite end of said receiver passage from said one end thereof, and a releasing sleeve having inwardly facing bevel surfaces axially movably disposed in said interior recess of said latching sleeve adjacent said spring element and between said latching sleeve and said tubular sleeve and axially movable to engage said inwardly facing bevel surfaces thereof with said outwardly facing bevel surface means of said latches to cause the latches to be moved radially inwardly in said window openings and out of said body passage recess.

2. The combination of claim 1, said latches each having an inward side recess and said spring elements each having a terminal lug portion engaged in the recess of one of said latches, said releasing sleeve having interior engagement means not interiorly shielded by said tubular sleeve for engagement by a releasing tool inserted therethrough for moving said releasing sleeve against said bevel surfaces of said latches, there being included releasable connection means for holding said releasing sleeve stationary relative said latching sleeve until said releasing sleeve is moved as described by said releasing tool.

3. The combination of claim 2, said releasing tool comprising an inner tubular sleeve element coaxially disposed through said latching sleeve and said tubular sleeve carried thereby, said inner sleeve element including connection means at an end thereof for connection of a suitable handling member thereto, an outwardly projecting retaining nut at the other end of said inner sleeve element, an intermediate sleeve surrounding said inner sleeve element, a latch sleeve connected to said intermediate sleeve at one end and spaced outwardly therefrom at its other portions, a spring mandrel slidably disposed between said intermediate sleeve and said latch sleeve and having a plurality of depending elongate spring elements at its end toward said connection between said inner and latch sleeves, said latch sleeve having a plurality of circularly spaced window openings therethrough intermediate its length and having in each said window opening a latch member freely movable therein radially inwardly and outwardly and engageable when moved outwardly in said interior annular recess of said releasing sleeve, said spring mandrel having frangible connection to said latch sleeve in a position wherein said spring elements engage with and bias said latch members outwardly, and being movable therefrom by imposition of axial force to a position wherein said spring mandrel holds said latch members outwardly moved and engaged as described, and shoulder means on said inner sleeve element for imposition of such axial force on said spring mandrel upon movement of said inner sleeve element.

4. The combination of claim 3, including overshot connection means on an end of said spring mandrel, including recess means within said latch sleeve to hold said spring mandrel in said position wherein said latch members are held outwardly.

5. A remotely positionable and removable wellhead sealing apparatus adapted to close in a fluidtight manner the top of a wellhead assembly located underwater at an offshore location, said sealing apparatus comprising a body member having a chamber formed therein, said body member being of a size to operatively engage the open top of a wellhead assembly having a recessed locking groove in the wall thereof, latch means carried by said body member and extendible beyond the outer surface thereof and of a size to seat in the recessed groove in the wall of the wellhead assembly, latch actuating means carried by said body member and operatively engaging said latch means for selectively moving said latch means to an operative position, and sealing means carried on the surface of the body member for establishing a fluidtight seal between said body member and the wellhead assembly.

6. Combination according to claim 5 wherein said body member comprises a tubular conduit having an outer surface forming said outer surface of the body member and having an annular recess disposed inwardly of said outer surface, said latch means comprises a plurality of latches circumferentially disposed around said tubular conduit, said latches each including a first portion disposed in said annular recess mounted for movement inwardly and outwardly thereof and a second portion extending from said recess and mounted for movement between a position entirely on one side of said outer surface of the conduit and a position extending beyond said outer surface of the conduit to the other side thereof, said second portion being adapted to engage said recessed locking groove in the top of a wellhead assembly when outward movement of said first portion causes said second portion to be extended beyond said outer surface of the conduit toward said wellhead assembly groove, and said latch actuating means includes a sleeve having cam surface means to press against each of said latches to move said first portion thereof inwardly and withdraw said second portion from said wellhead assembly groove.

7. Combination according to claim 6 wherein said tubular conduit has a circumferential downwardly facing surface, and said sealing means carried by said body member comprises an annular gasket disposed coaxial with said tubular conduit below said circumferential downwardly facing surface, part of said gasket ring being in engagement with said tubular conduit and an outer part of said gasket ring being adapted for engagement with a circumferential recess formed in said top of a wellhead assembly to seal between said conduit and wallhead assembly.

8. Combination according to claim 7 wherein said tubular conduit has an annular upwardly facing surface, and said sealing means further comprises a ring disposed coaxial with said tubular conduit adjacent said upwardly facing surface, said annular gasket being held between said ring and said second annular downwardly facing surface of said tubular conduit to hold said annular gasket in place on said tubular conduit prior to positioning of said wellhead apparatus on said top of a wellhead assembly.

9. Combination according to claim 8 wherein
said body member further comprises a blowout preventer means connected to said tubular conduit to shut off flow therethrough,
said tubular conduit having an annular downwardly facing surface adapted to rest on a correlative upwardly facing surface of said top of a wellhead assembly to support the weight of said tubular conduit and blowout preventer means thereon.

10. Wellhead connection apparatus, remotely positionable and removable, adapted to make connection in a fluid tight manner with the top of a wellhead assembly located underwater at an offshore location, comprising
a tubular conduit having an annular recess formed therein and having an annular downwardly facing surface adapted to rest on a correlative upwardly facing surface of the top of a wellhead assembly to support the weight of said apparatus,
latch means carried by said conduit movable from an inoperative position to an operative position to cooperate with annular latch engaging means carried by said top of a wellhead assembly to hold said tubular conduit to said top of a wellhead assembly, said latch means comprising a plurality of latches circumferentially disposed around said tubular conduit, said latches each including a first portion disposed in said annular recess mounted for movement inwardly and outwardly thereof and a second portion movable with said first portion and extending out of said recess and adapted to engage said latch engaging means carried by the top of a wellhead assembly upon outward movement of said first portion,
latch actuating means carried by said conduit for moving said latch means to and from said operative position, said latch actuating means including a sleeve having cam surface means to press against each of said latches to move said first portion thereof inwardly and withdraw said second portion from said latch engaging means carried by said top of a wellhead assembly, and
sealing means carried by said tubular conduit for establishing a fluid tight seal between said tubular conduit and said wellhead assembly.

11. Combination according to claim 10 wherein
said tubular conduit has a circumferential downwardly facing surface, and
said sealing means comprises an annular gasket ring disposed around said tubular conduit below said circumferential downwardly facing surface,
part of said gasket ring being in engagement with said tubular conduit and an outer part of said gasket ring being adapted for engagement with a circumferential recess formed in said top of a wellhead assembly to seal between said conduit and wellhead assembly.

12. Combination according to claim 11 wherein
said tubular conduit has an annular upwardly facing surface, and
said sealing means further comprises a ring disposed coaxial with said tubular conduit adjacent said upwardly facing surface,
said annular gasket being held between said ring and said second annular downwardly facing surface of said tubular conduit to hold said annular gasket in place on said tubular conduit prior to positioning of said wellhead apparatus on said top of a wellhead assembly.

13. In combination with a wellhead assembly adapted for disposition at an offshore underwater location, wellhead connection apparatus remotely positionable on and removable from said wellhead assembly and adapted to make connection therewith in a fluid tight manner, said apparatus comprising
a tubular conduit having an annular downwardly facing surface adapted to rest on a correlative upwardly facing surface of the top of a wellhead assembly to support the weight of said apparatus,
latch means carried by said conduit movable from an inoperative position to an operative position to cooperative with annular latch engaging means carried by said top of a wellhead assembly to hold said tubular conduit to said top of a wellhead assembly,
latch actuating means carried by said conduit including a sleeve having cam surface means for moving said latch means from said operative position to said inoperative position,
sealing means carried by said tubular conduit for establishing a fluid tight seal between said tubular conduit and said wellhead assembly,
said assembly and apparatus including flaring guide means to align said apparatus with said assembly when said apparatus is being connected to said wellhead assembly.

14. Combination according to claim 13 including operator means engaging said sleeve of said latch actuating means for applying force to the last said sleeve to move said sleeve axially, said operator means including a portion extending upwardly from said sleeve adapted for use above the surface of the water while said wellhead assembly is located underwater.

References Cited
UNITED STATES PATENTS

| | | | |
|---|---|---|---|
| 115,917 | 6/1871 | Wharton | 285—319 |
| 793,103 | 6/1905 | Scholtz | 285—305 |
| 1,200,266 | 10/1916 | Strausser | 285—308 |
| 2,380,669 | 7/1945 | Mowrey | 166—218 |
| 2,409,811 | 10/1946 | Taylor et al. | 166—125 |
| 2,461,705 | 2/1949 | Stranberg | 285—305 |
| 2,547,108 | 4/1951 | Anderson | 292—170 |
| 2,737,247 | 3/1956 | Baker | 166—218 |
| 2,842,212 | 7/1958 | Lebourg | 166—125 |
| 2,939,737 | 6/1960 | Nygren | 292—170 |

CHARLES E. O'CONNELL, *Primary Examiner.*

JAMES A. LEPPINK, *Examiner.*

PO-1050
(5/69)

UNITED STATES PATENT OFFICE
CERTIFICATE OF CORRECTION

Patent No. 3,330,341　　　　　　　Dated July 11, 1967

Inventor(s) JOHN G. JACKSON, JR., and ALLEN F. RHODES

It is certified that error appears in the above-identified patent and that said Letters Patent are hereby corrected as shown below:

Column 1, in the Caption, after "Bank of the Southwest National Association," insert --Houston,--. Column 6, line 70, cancel "wallhead" and substitute --wellhead--. Column 8, lines 24 and 25, cancel "cooperative" and substitute --cooperate--.

SIGNED AND
SEALED
APR 7 1970

(SEAL)
Attest:

Edward M. Fletcher, Jr.
Attesting Officer

WILLIAM E. SCHUYLER, JR.
Commissioner of Patents